(12) United States Patent
Nabeta et al.

(10) Patent No.: US 10,974,966 B2
(45) Date of Patent: Apr. 13, 2021

(54) ZIRCONIUM BORIDE AND METHOD OF ITS MANUFACTURE

(71) Applicant: DAIICHI KIGENSO KAGAKU KOGYO CO., LTD., Osaka (JP)

(72) Inventors: Takuji Nabeta, Osaka (JP); Keita Kanenishi, Osaka (JP); Sadahiro Yagishita, Osaka (JP); Taichi Kunisada, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 15/777,917

(22) PCT Filed: Jan. 26, 2017

(86) PCT No.: PCT/JP2017/002796
§ 371 (c)(1),
(2) Date: May 22, 2018

(87) PCT Pub. No.: WO2017/131108
PCT Pub. Date: Aug. 3, 2017

(65) Prior Publication Data
US 2018/0339909 A1 Nov. 29, 2018

(30) Foreign Application Priority Data
Jan. 27, 2016 (JP) ................ JP2016-013734

(51) Int. Cl.
*C01B 35/04* (2006.01)
*C04B 35/653* (2006.01)
(Continued)

(52) U.S. Cl.
CPC ........ *C01B 35/04* (2013.01); *C04B 35/58078* (2013.01); *C04B 35/653* (2013.01);
(Continued)

(58) Field of Classification Search
None
See application file for complete search history.

(56) References Cited

U.S. PATENT DOCUMENTS

2001/0030007 A1 10/2001 Faber et al.
2002/0003228 A1* 1/2002 Niwa .................. H01B 1/14
252/516
(Continued)

FOREIGN PATENT DOCUMENTS

CN 103864085 A 6/2014
GB 1273523 A 5/1972
(Continued)

OTHER PUBLICATIONS

Jia et al.; Ultra-Fine Zirconium Diboride Powders Prepared by a Combined Sol-Gel and Spark Plasma Sintering Technique; J Sol-Gel Sci Technology; 77:636-646; 2016.*
(Continued)

*Primary Examiner* — Guinever S Gregorio
(74) *Attorney, Agent, or Firm* — SZDC Law P.C.

(57) ABSTRACT

In order to provide a zirconium boride that provides high caloric value at the time of its combustion with a compound having radicals such as perchlorate and can combust in a short period of time, while providing high physical stability,
(Continued)

an amount of radical derived from lattice defect detected by ESR spectroscopy, is set to $0.1 \times 10^{15}$ spin/mg or more.

3 Claims, 1 Drawing Sheet

(51) Int. Cl.
    *C04B 35/58*     (2006.01)
    *C22C 1/10*     (2006.01)
    *C22C 29/14*     (2006.01)

(52) U.S. Cl.
    CPC ............... *C22C 1/10* (2013.01); *C22C 29/14* (2013.01); *C01P 2002/86* (2013.01); *C01P 2002/88* (2013.01); *C01P 2006/12* (2013.01); *C04B 2235/3244* (2013.01); *C04B 2235/422* (2013.01); *C04B 2235/5409* (2013.01); *C04B 2235/5436* (2013.01); *C04B 2235/661* (2013.01); *C04B 2235/72* (2013.01); *C04B 2235/721* (2013.01); *C04B 2235/76* (2013.01)

(56) References Cited

U.S. PATENT DOCUMENTS

2007/0144636 A1      6/2007    Narumi
2011/0212330 A1      9/2011    Schrumpf et al.

FOREIGN PATENT DOCUMENTS

JP      S63-134571 A      6/1988
JP      H07277734 A      10/1995
JP      H70257920 A      10/1995
JP      H0971465 A      3/1997
JP      2004099367 A      4/2004

OTHER PUBLICATIONS

Zhang et al.; Pressureless Sintering of Carbon-Coated Zirconium Diboride Powders; Materials Science and Engineering A; 459, 167-171; 2007.*

Zhu et al.; Pressureless Sintering of carbon-Coated Zirconium Diboride Powders (Year: 2008).*

Eun-Young Jung et al."Syntheis of ZrB powders by carbothermal and borothermal reduction" J. Alloys Compd. 2012, 538, 164-168, May 17, 2012.

X Y Tao et al. "Synthesis and characterization of a Boron-containing precursor of ZrB2 ceramic" J. Ceram. Sci. Tech. 2016, 07, 107-112, Jan. 1, 2016.

Middleburgh, Simon C., et al., Atomic Scale Modeling of Point Defects in Zirconium Diboride, J Am Ceram Soc, Jul. 2011, vol. 94, No. 7, p. 2225-2229.

* cited by examiner

ZIRCONIUM BORIDE AND METHOD OF ITS MANUFACTURE

This application is the national stage application PCT/JP2017/002796, filed on Jan. 26, 2017, which claims priority to Japanese Application No. JP 2016-013734, filed on Jan. 27, 2016, each of which is incorporated by reference for all purposes as if fully set forth herein.

TECHNICAL FIELD

This invention relates to an ignitable zirconium boride and a method of its manufacture.

BACKGROUND ART

Conventionally, it is known that metallic powders such as metal zirconium, zirconium carbide, etc. combust in a short time when mixed with perchlorate. For instance, according to Patent Document 1, metallic zirconium powder is employed as an igniter for an airbag inflator. However, these metallic powders suffer such problems as low calorific value at the time of their combustion and poor physical stability. Thus, there remains need for a metallic powder having distinguished ignition performance and higher physical stability.

On the other hand, borides are a very large class of compounds that generally have high melting points. And, it is known that naturally occurring borides are non-ionic. Especially, zirconium boride, which is a kind of metal boride, has a high melting point of 3000° C. or higher. In addition to its principal characteristics as a metal such as metallic glossy appearance and high electric conductivity, it has characteristics of ceramics such as high hardness, thus having lacks of malleability and ductility and brittleness. For these characteristics, synthesis of zirconium boride and development of its sintered body have been conducted since around 1980 (see Patent Document 2 for example).

As for zirconium boride, mainly development of its application to refractory has been made. Whereas, in recent years, studies about improvement in composite forming techniques with other elements, control of its microstructure, etc. have been made (see. Patent Documents 3, 4 for instance).

Namely, Patent Document 3 describes, in connection with the composite forming technique of metal borides including zirconium boride, a method of manufacturing a spherical carbon-boride based ceramic composite comprising mixing carbon black, activated carbon, cokes, and their heat-treated products, or natural graphite, with one or two or more kinds of boride based ceramic powder selected from the group consisting of titanium boride, zirconium boride, tantalum boride, molybdenum boride, niobium boride, tungsten boride, hafnium boride, vanadium boride, and lanthanum boride and heat-treating the resultant mixture at from 2400 to 3000° C. The document reports that the spherical carbon-boride based ceramic composite obtained by the above method has a particle size ranging from 10 to 1500 μm and has a structure with its surface being made from carbon and its inside being made from mixture of carbon and the ceramics.

Further, Patent Document 4 describes a zirconium boride based porous body consisting substantially solely of crystalline $ZrB_2$ and non-crystalline B, with the mole ratio of the non-crystalline B/crystalline $ZrB_2$ ranging from 0.4/1 to 4/1. The document reports that as such zirconium boride based porous body is distinguished in its function for improving catalyst function and distinguished also in its heat resistance, it is expected for this porous body to achieve high performance when used as a catalyst carrier.

Further, zirconium boride, due to its distinguished characteristics other than those mentioned above, has been put in various uses such as a material for forming a cutting tool, an electrolytic melting compound electrode, a surface coating of a bearing ball, etc. As one example thereof, there can be cited a raw material of e.g. cermet (see Patent Document 5 for instance).

BACKGROUND ART DOCUMENTS

Patent Documents

Patent Document 1: Japanese Unexamined Patent Application Publication No. 2007-176739
Patent Document 2: Japanese Unexamined Patent Application Publication Sho. 63-134571
Patent Document 3: Japanese Unexamined Patent Application Publication Hei. 7-257920
Patent Document 4: Japanese Unexamined Patent Application Publication Hei. 7-277734
Patent Document 5: Japanese Translation of International Patent Application No. 2009-519885

SUMMARY OF THE INVENTION

Object to be Accomplished by Invention

Notwithstanding, while zirconium boride, due to its distinguished properties, has been put into various uses, its study and development are still in progress, and there remains a need for research and development in seeking possibility of development of further applications thereof.

The present invention has been made in view of the above-described object and aims at providing, as a zirconium boride useable for novel applications, a zirconium boride that provides high caloric value at the time of its combustion with a compound having radicals such as perchlorate and can combust in a short period of time, while providing high physical stability. The invention aims at providing a method of its manufacture also.

Solution

In view of the above-described state of the art, the present inventors have conducted intensive and extensive studies and discovered a novel ignitable zirconium boride, thus completing the present invention.

Namely, the subject matters of the present invention are as follows.

[1] Zirconium boride having an amount of radical derived from lattice defect detected by ESR spectroscopy, which amount is $0.1 \times 10^{15}$ spin/mg or more.

[2] The zirconium boride of [1] having an amount of radical derived from lattice defect determined by ESR spectroscopy which amount is $0.5 \times 10^{15}$ spin/mg or more and an amount of total radical derived from both the lattice defect and unpaired electron derived from a distortion of the crystalline structure, which total amount is $2.0 \times 10^{15}$ spin/mg or more.

[3] The zirconium boride of [1] or [2], wherein when TG-DTA analysis is performed in a nitrogen atmosphere for a mixture thereof with a perchlorate, a resultant characteristic temperature increase curve determined by TG-DTA analysis has a heat generation peak between 400 and 600° C., and its heat generation rate is 10 µV/mg or more.

[4] The zirconium boride of [3] wherein the perchlorate is at least one of potassium perchlorate and ammonium perchlorate.

[5] The zirconium boride of any one of [1] through [4], wherein carbon is present therein by from 1 to 15% by weight.

[6] The zirconium boride of any one of [1] through [5], having a specific surface area ranging from 5 to 50 m$^2$/g.

[7] A method of manufacturing zirconium boride, comprising:

a step 1 of mixing zirconium oxide, boron trioxide and carbon such that a mass ratio of the boron trioxide relative to the zirconium oxide in the resultant mixture ranges from 90 to 120% by mass and a mass ratio of the carbon relative to the same ranges from 40 to 60% by mass;

a step 2 of sintering the mixture obtained at step 1 at from 400 to 600° C.;

a step 3 of melting the sintered product obtained at step 2 in a reducing atmosphere of argon gas by a plasma argon arc at a temperature higher than the melting point of zirconium boride; and a step 4 of slowly cooling the melted product obtained at step 3 to obtain an ingot of zirconium boride.

[8] The manufacturing method of [7] wherein at step 3, an electric power having a unit power consumption of 3 to 30 kwh/kg is applied.

Effects of the Invention

The inventive zirconium boride, due to its inclusion of radical derived from lattice defect, can acquire an enhanced reactivity with other radical compound, namely, enhanced ignitability. Thus, the inventive zirconium boride can provide higher caloric value and speedy combustion at the time of its combustion with a compound having radical such as perchlorate.

Moreover, in the absence of such compound having radical such as perchlorate, the inventive zirconium boride can maintain a stable state up to 600° C. in the air, like the conventional standard zirconium boride. Thus, the inventive zirconium boride has distinguished physical stability also.

EMBODIMENT

Figure 1:
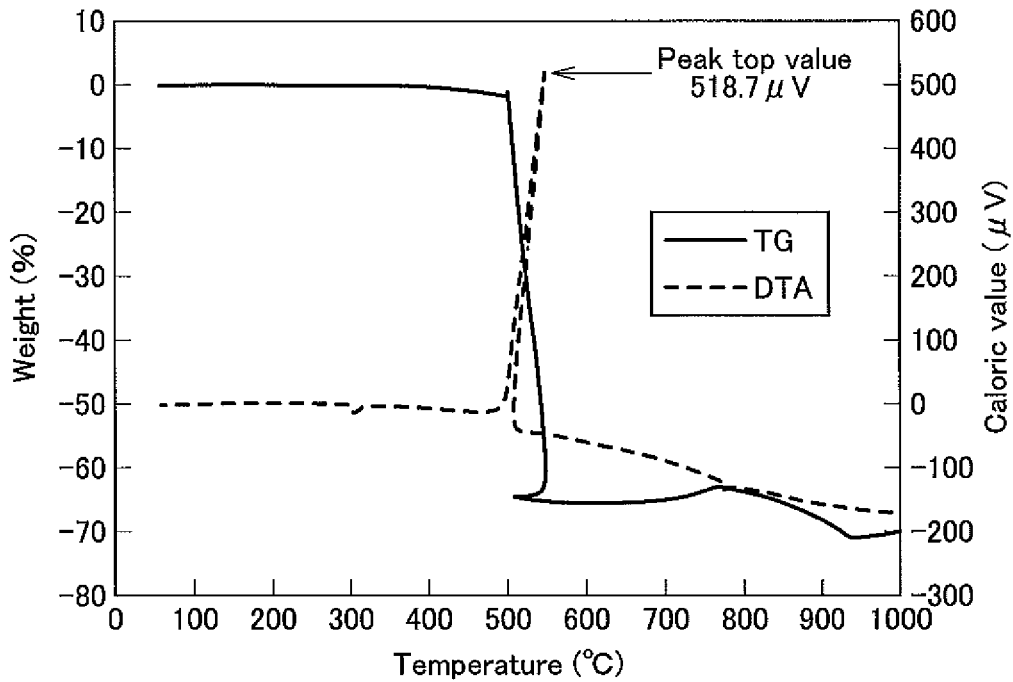
FIG. 1 is a graph showing TG-DTA (thermogravimetry—differentia thermal analysis) curve of zirconium boride powder obtained in Example 1.

The inventive zirconium boride is characterized by presence of radical derived from lattice defect whose amount is 0.1×1.0$^{15}$ spin/mg or more as determined by the ESR (electron spin resonance) spectroscopy.

Next, the inventive zirconium boride and method of its manufacture will be described in details. In this detailed description, a mark "%" represents wt. %=mass %, unless explicitly indicated otherwise.

1. Zirconium Boride

A zirconium boride according to the present invention contains zirconium boride as its principal component and contains also carbon by 1-15%, preferably by 3-12%. The other components thereof are not particularly limited. But, it can additionally contain some impurity from its raw materials.

The inventive zirconium boride has a characteristics that when it is combusted with a compound having radical such as perchlorate, the inventive boride provides a high caloric value at the time of combustion and can combust in a short period of time.

It is presumed that such ignitability of the zirconium boride, namely, instantaneous reactivity with e.g. perchlorate is attributable to the presence of significant amount of radical derived from lattice defect in its crystalline structure. And, the presence of such lattice-defect derived radical provides enhanced reactivity of the zirconium boride. As some exemplary grounds of the radical being derived from lattice defect include a fact that a g-value in the ESR spectroscopy is a value approximate to 2.0023 which is the g-value for free radicals and a further fact that no presence of radical species is confirmed in the compound employed as the raw material.

Further, in the ESR spectroscopy result shown in Table 1 in Examples to be described later, it is shown that the g-value of Example 1 is 2.425. This indicates a distortion of the crystalline structure. From these, it may be presumed that not only the radical, but also the distortion of crystalline structure affects the reactivity of zirconium boride.

The amount of radical derived from lattice defect in the inventive zirconium boride is 0.1×10$^{15}$ spin/mg or more, preferably 0.5×10$^{15}$ spin/mg or more. The upper limit is not particularly limited. However, if the amount becomes equal to the spin amount of metal zirconium (theoretical amount: 2.2×10$^{18}$ spin/mg), this will lead to increase of the reactivity, rendering handling difficult. So, it is preferred that the amount not exceed the above-cited spin amount. Incidentally, if the amount of the lattice-defect derived radical is below 0.1×10$^{15}$ spin/mg, the advantageous effect of the present invention cannot be achieved.

It is also presumed that the amount of all radicals including unpaired electrons in the zirconium boride (total spin amount) is also responsible for the advantageous effect of the present invention. Specifically, it is believed that the reactivity is further improved if such total radical amount is large in addition to the amount of radical derived from lattice defect. Then, preferably, the total spin amount is 1.0×10$^{15}$ spin/mg or more, more preferably 2.0×10$^{15}$ spin/mg or more.

Referring more particularly to the combustion mechanism of zirconium boride, the best known element of radical which contributes to the combustion mechanism is hydrogen. When hydrogen is combusted, a large amount of radical will be involved in this combustion which is called a chain branching reaction. Then, in the inventive zirconium boride too, by positively and intentionally increasing the crystalline structure distortion, the resultant radical amount is increased nearly to 100 times that of the normal zirconium boride. Thus, it is believed that the reaction with e.g. perchlorate proceeds more speedily via a combustion mechanism similar to that occurs with hydrogen described above.

According to one preferred embodiment of the inventive zirconium boride, when TG (thermogravimetry)-DTA (differential thermal analysis) analysis is performed in a nitrogen atmosphere for a mixture thereof with a perchlorate, which is generally employed as a strong oxidizing agent, a characteristic temperature increase curve determined by TG-DTA analysis performed at a temperature increase rate of 3 to 20° C./min., preferably 5 to 10° C./min., has a heat generation peak in the span from 400 to 600° C. and a heat generation rate of 10 μV/mg or more, more preferably 20 μV/mg or more, even more preferably 30 μV/mg or more, or especially preferably 40 μV/mg or more. Incidentally, an instrument for use in the TG-DTA analysis can be a conventionally employed one and a sample pan can be formed of alumina or silica advantageously.

The perchlorate can be potassium perchlorate, ammonium perchlorate, sodium perchlorate, etc. Among these, potassium perchlorate is preferred. Potassium perchlorate is a compound having a melting point of 610° C., begins its decomposition at 300 to 400° C., and reacts with zirconium boride with a high efficiency. When potassium perchlorate is to be mixed, its mixing ratio ranges from 30 to 50% relative to the zirconium boride, preferably.

The theoretical density of the inventive zirconium boride is 6.1 g/cm$^3$. The lower the zirconium boride density, the greater the amount of carbon present. Thus, although the lower limit of the density of ingot obtained by an inventive method of manufacture to be described later is not particularly limited, the lower limit will range around 5.2 g/cm$^3$.

Further, the specific surface area of the inventive zirconium boride is relatively high due to the presence of carbon therein. The specific surface area of the zirconium boride is not particularly limited, but according to the inventive method of manufacture to be described later, it will range around 11 m$^2$/g in the case of an average particle size of 5.7 μm. With coarse pulverization thereof to 10 to 45 μm, it will range around 0.2 m$^2$/g.

2. Method of Manufacturing Zirconium Boride

An inventive method of manufacturing zirconium boride comprising steps 1-4 as follows.

(1) a step 1 of mixing zirconium oxide, born trioxide and carbon such that a mass ratio of the boron trioxide relative to the zirconium oxide in the resultant mixture ranges from 90 to 120% by mass and a mass ratio of the carbon relative to the same ranges from 40% to 60% by mass;

(2) a step 2 of sintering the mixture obtained at step 1 at from 400° C. to 600° C.;

(3) a step 3 of melting the sintered product obtained at step 2 in a reducing atmosphere of argon gas by a plasma argon arc at a temperature higher than the melting point of zirconium boride; and (4) a step 4 of slowly cooling the melted product obtained at step 3 to obtain an ingot of zirconium boride.

The above-described inventive method of manufacturing zirconium boride allows economical manufacture since it employs zirconium oxide which can be easily synthesized, and boron trioxide and carbon which can be inexpensively available; and the inventive method allows also high yield production of zirconium boride. Moreover, the ingot obtained by this method of manufacture can be pulverized if needed, whereby powder of zirconium boride can be conveniently obtained without needing e.g. a sintering process.

Next, the respective steps will be explained.

(1) Step 1

Step 1 is a step of mixing zirconium oxide, a boron compound and carbon.

Preferably, the zirconium oxide can be one available on the market. Although zirconium oxide has no particular limitations by its physical properties such as an average particle size, a specific surface area, etc., the average particle size is preferably 1 μm or greater, more preferably 3 μm or greater. Manufacture of zirconium boride will still be possible even when the average particle is below 1 In this case, however, powder scattering due to e.g. carbon dioxide gas generated from a reaction: $ZrO_2+B_2O_3+5C \rightarrow ZrB_2+5CO\uparrow$ tends to occur; thus, there is a risk of reduction in the yield of zirconium boride, consequently. Incidentally, in this detailed description, the average particle sizes are values determined by a laser diffraction particle distribution analyzer: LA-950 (from HORIBA Ltd.).

The zirconium oxide contains hafnium as an impurity, with its content being 2.2 mass % or less. Further, in case the zirconium oxide contains other impurity than hafnium, preferably, it should be present less than 1 mass %, more preferably 0.5 mass % or less, even more preferably 0.1 mass % or less. It is believed that presence of other impurity than hafnium at 1 mass % or more will adversely affect the characteristics of the zirconium boride due to the presence of the impurity. For instance, if desilicated zirconium oxide is employed as a raw material, there will occur a tendency that a radioactive element such as uranium, thorium, will remain in the order of tens of ppm. So, the raw materials should be selected according to the need.

As boron trioxide ($B_2O_3$), it in the form of powder can be employed. Preferably, it is in the form of anhydride. If it contains a large amount of water, this may cause an explosive boiling phenomenon at the time of plasma arc melting. Aside from boron trioxide, the boron material can be elementary boron, boron nitride, boron carbide, etc. However, boron trioxide has advantages in terms of handling and cost. The average particle size of the powdery boron material is not particularly limited. But, preferably, it is 1 μm or more, more preferably, 3 μm or more. Manufacture of zirconium boride will still be possible even when the average particle is below 1 μm. In this case, however, like the above-described case of zirconium oxide, powder scattering due to e.g. carbon dioxide gas tends to occur; thus, there is a risk of reduction in the yield of zirconium boride, consequently.

The zirconium oxide and the boron trioxide, with taking into consideration e.g. the scattering of the boron trioxide, should be mixed such that the mass ratio of boron trioxide relative to the zirconium oxide in the mixture ((mass of boron trioxide/mass of zirconium oxide)×100) will range from 90 to 120 mass %, preferably from 100 to 110 mass %.

As carbon, powdery carbon can be employed. In the case of carbon in the form of agglomeration, this may cause difficulty in a granulation process at step 2. The average particle size of the powdery carbon is not particularly limited, but preferably is 2 mm or less, more preferably 0.5 mm or less. In the case of fine particles having an average particle size of 10 μm or less, such powdery carbon will scatter into the atmosphere at the time of granulation process at step 2, so use of protector or the like will be needed. Further, like the case of zirconium oxide or boron trioxide, scattering due to carbon dioxide gas tends to occur also.

Impurity present in carbon should preferably be less than 1 mass %, more preferably 0.5 mass % or less. It is believed that presence of impurity at 1 mass % or more will adversely affect the properties of zirconium oxide due to the influence derived from the impurity.

Zirconium oxide and carbon should be mixed, in consideration to combustion of carbon, etc., so that the mass ratio (%) of carbon relative to zirconium oxide in the mixture ((mass of boron trioxide/mass of zirconium oxide)×100) will range from 40 to 60 mass %. If the mass ratio is less than 40 mass % this will result in shortage of carbon amount due to combustion and scattering of carbon. Then, some of the zirconium oxide ($ZrO_2$) will not become zirconium boride ($ZrB_2$), but zirconium carbide (ZrC) and/or zirconium monoxide (ZrO). Further, if the mass ratio exceeds 60 mass %, the amount of carbon is excessive, so that there will occur residual of excessive carbon within the obtained ingot of zirconium boride, which can cause reduction in the density and Vickers hardness, disadvantageously.

The method of mixing zirconium oxide, boron trioxide and carbon is not particularly limited, but can be any means that allows uniform mixing. For example, known mixers such as a V-mixer, a rocking mixer, a ribbon mixer can be cited as some examples. Among these, the V-mixer is particularly preferred since its structure is simple with less dead zone and it can provide uniform mixing.

(2) Step 2

Step 2 is a step of sintering the mixture obtained at step 1.

Boron oxide has a low specific gravity and can be easily scattered. So, it requires granulation treatment. The common method of granulation is wetting raw material with pure water. However, $B_2O_3$ reacts with water to generate heat, so it is difficult to employ this method. Further, $H_2BO_3$ does not react with water, but foaming thereof occurs during drying of granulated powder, which deforms the shape of grains. So, it is difficult to use this method also. Then, in the present invention, there is employed a sintering granulation method which granulates the mixture as raw material by sintering it at a low temperature. The sintering temperature preferably ranges from 400 to 600° C., more preferably from 450 to 550° C. If the temperature is 400° C. or lower, this will result in weakness in the coagulation force for grains, thus tending to invite scattering. On the other hand, if the temperature exceeds 600° C., this will result in increase in the coagulation force. However, since the melting point of boron trioxide is around 480° C., segregation of melted boron trioxide will tend to occur.

In this way, with use of the sintering granulation technique of sintering near the melting point of boron trioxide, there can be obtained the inventive zirconium boride having ignitability. While the details of reason for this remain unknown, it may be presumed that a portion of boron trioxide will be melted within the mixture to solidify carbon, whereby carbon can be dispersed extensively within the zirconium boride and also crystal growth of the zirconium boride powder can be suppressed, as a result, the specific surface area of the zirconium boride is increased, thus enhancing the ignitability.

(3) Step 3

Step 3 is a step of melting the sintered granulated product obtained from step 2 by argon plasma.

For melting the sintered granulated product, the known arc electric furnace can be employed. However, with simple use of the conventional arc electric furnace alone, it is difficult to maintain the inside of the furnace at a temperature higher than the melting point of zirconium boride, so high-yield synthesis of ingot of zirconium boride is not possible. For this reason, in this invention, melting by argon plasma is essentially required.

In the argon plasma technique, an arc electric melting furnace is filled with argon gas, thus being rendered into a reducing atmosphere and plasma is generated. At step 3, though depending on the size, the shape, etc. of the furnace employed, the electric power unit to be applied is important, which preferably ranges from 3 to 30 kwh/kg approximately, more preferably from 5 to 20 kwh/kg, even more preferably from 7 to 15 kwh/kg. If it is less than 3 kwh/kg, there is electric power shortage, which makes sufficient melting difficult. Conversely, if it exceeds 30 kwh/kg, this will lead to excessive mono-crystallization of zirconium boride, so the target lattice defect will not be formed sufficiently, thus tending to invite failure of sufficient radical formation derived from lattice defect.

Further, argon plasma is a plasma having high stability finding its use also in the inductively coupled plasma light emission analysis. So, it is also reported that it can reach an extremely high temperature of 8000° C. or higher. Therefore, it is possible to maintain the entire inside of the furnace at a temperature higher than the melting point of zirconium boride. As a result, an ingot of zirconium boride can be obtained in a stable and efficient manner. The atmosphere pressure inside the furnace is not particularly limited, and it can be a normal pressure, a raised pressure or a reduced pressure. However, normally, the normal pressure can be used for implantation. Further, when needed, cokes as electrically conductive material also can be added to the grains in order to promote initial electric conduction.

As the "argon gas", argon gas (elementary substance) or inactive gas containing argon can be employed. And, such gas will be introduced to fill the inside of the furnace simultaneously with electric power supply to the electric melding furnace. As an example of inactive gas containing argon gas, there can be cited a mixture gas comprised of argon gas mixed with at least one kind selected from helium, neon and carbon dioxide gas. Taking into consideration the fact that helium and neon are expensive and also the fact that melting with stable argon plasma is desirable, use of argon gas (elementary substance) is preferred. Respecting the flow rate of such argon gas or such inactive gas containing argon gas, its specific numerical limitation is difficult as it depends on the size of the furnace, the circulation situation of the atmosphere inside the furnace. However, a flow rate that allows for stable generation of argon plasma will be needed.

(4) Step 4

Step 4 is a step of slowly cooling the melted product obtained at step 3 to obtain an ingot of zirconium boride.

In the course of such slow cooling of the melted product, preferably, the arc type electric furnace will be fitted with a lid made of carbon or the like and the slow cooling will be allowed to proceed, taking 20 hours or more, more preferably from 30 to 50 hours. The slow cooling rate is not particularly limited, but it will be normally 100 to 500° C./hr. With this, an ingot of zirconium boride can be formed. In the course of this, if there occurs sharp drop in the temperature of the melted product, it is preferred to avoid such sharp temperature drop by heating the melted product after the slow cooling process. By implementing the slow cooling process while avoiding sharp temperature drop, uniform solid solution of the elements in the melted product will occur, whereby the ingot of zirconium boride can be obtained in a high yield. Incidentally, after formation of the ingot, the ingot may be withdrawn from the arc electric melting furnace and subjected to natural cooling until its temperature becomes 100° C. or lower, preferably, 50° C. or lower.

The zirconium boride ingot obtained through the above process has a size extending 50 mm or more, even with melting of about 5 kg of the mixture as the raw material, though depending on the melting amount and the shape of the crucible employed. Here, the "size of ingot" means the length of the longest one of the vertical, lateral and height (thickness) sides of the ingot.

The obtained ingot may be subjected to a pulverizing process if needed. For such pulverization, further fine pulverizing can be carried out with using a commonly employed pulverizing machine such as a planetary pulverizer, a ball mill, a jet mill, etc. It may be done appropriately, according to a contemplated use of the composite oxide. In case a pulverizing technique involving heat generation which leads to ignition is chosen, the pulverization may be carried out in a nitrogen atmosphere as needed. Incidentally, the average particle size of zirconium boride can be determined by e.g. a laser diffraction particle distribution analyzer or the like.

As described above, according to the method of manufacture having the respective steps of steps 1-4, the inventive zirconium boride can be manufactured easily. And, according to this method, as the raw material is heated until being rendered into a molten state, the finally manufactured composite oxide can be obtained as a solid solution. Incidentally, although the inventive method of manufacture essentially requires the steps 1-4, any other step(s) may be added thereto also, if needed or desired.

EXAMPLES

Next, examples will be disclosed for explaining the present invention more particularly. However, it is understood that the present invention is not to be limited in any way by the following examples. Further, it is also understood that materials obtained in the respective Examples and Comparison Examples contain, as an unavoidable impurity, hafnium oxide by 1 to 2 mass % relative to zirconium oxide.

DTA analysis conditions are as follows.
DTA instrument: Thermo plus TG-DTA8120 from Rigaku Corporation
Atmosphere: Nitrogen
Temperature increase rate: 5° C., 10° C.
Use of a pan formed of $Al_2O_3$
Specific surface area: BET method
Component analysis: ICP method
ESR spectroscopy conditions are as follows.
ESR spectrometer: Electron spin resonance analyzer Bruker E500
Determination mode: CW mode
Microwave frequency: About 9.9 GHz
Microwave intensity: 1.0, 4.0 mW
Magnetic field sweep range: 50, 300, 800 mT (500, 3000, 8000 Gauss)
Temperature: 296 K
Standard sample: 1, 1-diphenyl-2-picrylhydrazyl (DPPH)
Method of determination of radical amount: Spin concentration of actual sample is calculated with using a calibration curve produced from ESR spectrum of the standard sample (DPPH) having a known concentration.

Example 1

As zirconium oxide, powder having purity of 99.5 mass %, average particle size of 3 μm (from DAIICHI KIGENSO KAGAKU KOGYO Co., Ltd.) was employed. As carbon, powder, fine powder SGP (from SEC CARBON, Ltd.) was employed. As boron trioxide, $B_2O_3$ powder from BORAX Corporation was employed.

First, zirconium oxide powder: 3.8 kg, carbon powder: 1.9 kg, and boron trioxide powder: 4.3 kg were measured respectively. Then, these were mixed in a V-type mixer for 30 minutes.

Thereafter, the resultant mixture was calcinated at 480° C. for three hours, whereby sintered granules were obtained.

Next, the obtained sintered granules were laid in an electric melting furnace and electric power was supplied to the furnace with simultaneous introduction of argon gas for plasma generation at 0.03 MPa. The electric power was applied at 100 kwh for 1.5 hours to effect melting at a temperature higher than the melting point of the zirconium boride (power unit: 15 kwh/kg). After completion of melting, the introduction of argon gas was stopped and a carbon lid was fitted on the electric melting furnace and under this condition, the product was left at rest for 30 hours for slow cooling, whereby a zirconium boride ingot was obtained. The obtained ingot was crushed by a jaw crusher and a roll crusher to obtain powder having an average particle size of 3 mm approximately. Further, the resultant powder was pulverized by a planetary mill to adjust the average particle size to 5.7 μm. Carbon content of the zirconium boride obtained in this example was 3.6% and its S.A. value (specific surface area) was 11 $m^2/g$.

To the obtained zirconium boride, potassium perchlorate was added by a ratio of 40% and then mixed together well. The resultant mixture powder, 10.582 mg was subjected to DTA analysis at a temperature increase rate of 10° C./min. The result of this DTA analysis is shown in FIG. 1. FIG. 1 shows a TG-DTA curve and the horizontal axis represents the temperature (° C.), the left vertical axis represents a weight decrease ratio in TG and the right vertical axis represents a heat capacity (μV), respectively.

As shown in FIG. 1, the heat generation peak appeared near 500-550° C. and the heat generation amount seen from the peak top was 518.7 μV. Based on this value, calculation of the heat generation amount per unit weight gave: 518.7/10.528=49.3 μV/mg.

Further, the obtained zirconium boride powder was subjected to ESR spectroscopy. The g-values and radical amounts determined thereby are shown in Table 1 to follow.

Example 2

The ingot obtained in Example 1 was further pulverized by a planetary mill, whereby powder having an average particle size of 1.0 μm was obtained. The resultant powder gave a carbon content of 5.8% and S.A. value of 20.6 $m^2/g$.

To the obtained zirconium boride, potassium perchlorate was added by a ratio of 40% and then mixed together well. The resultant mixture powder, 8.1 mg was subjected to DTA analysis at a temperature increase rate of 5° C./m.

As a result, in the TG-DTA curve, the heat generation peak appeared near 500-550° C. and the heat generation amount seen from the peak top was 315.6 μV. Based on this value, calculation of the heat generation amount per unit weight gave: 315.6/8.1=39.0 μV/mg.

Example 3

Using the same raw materials as employed in Example 1, zirconium oxide powder: 149 kg, carbon powder: 72.5 kg, and boron trioxide powder: 169 kg were measured respectively. Then, these were mixed in the same manner as Example 1.

Thereafter, the resultant mixture was calcinated at 490° C. for three hours, whereby sintered granules were obtained.

Next, the obtained sintered granules were laid in an electric melting furnace and electric power was supplied to the furnace with simultaneous introduction of argon gas for plasma generation at 0.05 MPa. The electric power was applied at 500 kwh for 5 hours to effect melting at a temperature higher than the melting point of the zirconium boride (power unit: 6.4 kwh/kg). After completion of melting, the introduction of argon gas was stopped and slow cooling was effected for 2 days in the same manner as Example 1.

The obtained ingot of zirconium boride was crushed in the same manner as Example 1. Carbon content of the zirconium boride obtained in this example was 3.7%. The obtained zirconium boride powder was subjected to ESR spectroscopy, which gave g-values and radical amounts shown in Table 1.

Comparison Example 1

Zirconium boride was obtained by a similar method to that of Example 1, except for no implementation of calcination of mixture. The obtained zirconium boride gave a carbon content of 0.9% and S.A. value of 1.2 $m^2/g$.

Figure 2:
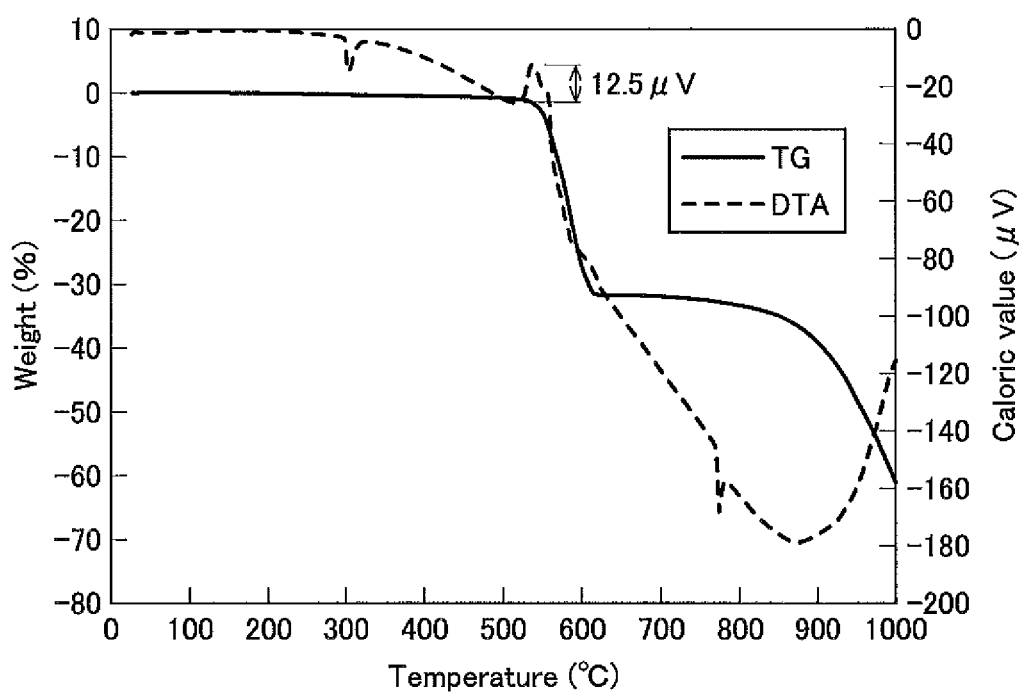
FIG. 2 is a graph showing TG-DTA curve of zirconium boride powder obtained in Comparison Example 1.

The obtained zirconium boride powder was mixed with potassium perchlorate by the same method as Example 1 and the resultant mixture powder: 9.624 mg was subjected to DTA analysis. The result of this DTA analysis is shown in FIG. 2. As shown in FIG. 2, the heat generation amount seen from the peak top was 12.5 µN. Based on this value, calculation of the heat generation amount per unit weight gave: 12.5 µV/9.624 mg=1.3 µV/mg.

Comparison Example 2

In Example 1, only the carbon powder amount was changed to 0.5 kg and by the same method, zirconium boride was obtained. The obtained zirconium boride powder gave a carbon content of 0.3% and S.A. value of 0.9 $m^2/g$.

The obtained zirconium boride powder was mixed with potassium perchlorate by the same method as Example 1 and the result mixture: 8.2 mg was subjected to DTA analysis.

As a result, the heat generation amount seen from the peak top in the TG-DTA curve was 17.4 µN. Based on this value, calculation of the heat generation amount per unit weight gave: 17.4 µV/8. 2 mg=2.1 µV/mg.

Comparison Example 3

When zirconium boride, a commercial product from Mitsuwa Chemicals Co., Ltd. was subjected to DTA analysis, there was obtained a result from which heat generation peak is not clearly recognizable (D50=16.5 S.A.=0.3 $m^2/g$). Further, the result of ESR spectroscopy made on this commercial product is shown in Table 1.

TABLE 1

| Sample name | g value | Radical amount (1.0 × $10^{15}$ spin/mg) | Characteristics |
|---|---|---|---|
| Example 1 | 2.0028 | 1.1 | Derived from lattice defect |
|  | 2.425 | 7 | All unpaired electrons |
| Example 3 | 2.0027 | 0.20 | Derived from lattice defect |
|  | Not detected | Not detected | All unpaired electrons |
| Comparison Example 3 | Not detected | Not detected | Derived from lattice defect |
|  | Not detected | Not detected | All unpaired electrons |

As described above, it was found that the inventive zirconium borides shown in Examples have enhanced ignitability as compared with zirconium borides shown in Comparison Examples.

Further, as shown in Table 1, in Examples 1 and 3, presence of radical was confirmed; whereas, in Comparison Example 3 using the commercial product, presence of radical was not confirmed. Thus, it was confirmed that the presence of radical in zirconium boride contributes to the ignitability.

Incidentally, in Example 3, presence of unpaired electron was not confirmed. However, since zirconium boride has ignitability, it may be understood that the essential requirement lies at least in presence of lattice-defect derived radical.

The invention claimed is:

1. A zirconium boride composition comprising:
   zirconium boride as a principal component;
   carbon, the carbon being from 1 to 15% by weight;
   a heat generation peak between 400 and 600° C.; and
   a heat generation rate of 10 µV/mg or more,
   wherein the heat generation peak and the heat generation rate are measured by a TG-DTA analysis, the TG-DTA analysis is performed in a nitrogen atmosphere for a mixture thereof with potassium perchlorate, and a resultant characteristic temperature increase curve determined by the TG-DTA analysis defines the heat generation peak and the heat generation rate.

2. The zirconium boride composition of claim 1, wherein the zirconium boride composition comprises zirconium boride as a principal component and carbon; and the carbon is from 3 to 12% by weight.

3. The zirconium boride composition of claim 1, wherein the zirconium boride composition has a specific surface area ranging from 5 to 50 $m^2/g$.

* * * * *